US006377802B1

(12) United States Patent
McKenna et al.

(10) Patent No.: US 6,377,802 B1
(45) Date of Patent: Apr. 23, 2002

(54) DOPPLER INSENSITIVE NON-TERRESTRIAL DIGITAL CELLULAR COMMUNICATIONS NETWORK

(75) Inventors: Daniel Bernard McKenna, Steamboat Springs; Brian Joseph Cox, Westminster, both of CO (US)

(73) Assignee: AirCell, Inc., Louisville, CO (US)

( * ) Notice: Subject to any disclaimer, the term of this patent is extended or adjusted under 35 U.S.C. 154(b) by 0 days.

(21) Appl. No.: 09/460,043

(22) Filed: Dec. 13, 1999

Related U.S. Application Data (63) Continuation-in-part of application No. 08/960,183, filed on Oct. 29, 1997, which is a continuation-in-part of application No. 08/027,133, filed on Mar. 8, 1993, now Pat. No. 5,444,762, and a continuation-in-part of application No. 07/847,920, filed on Mar. 6, 1992, now Pat. No. 5,557,656.

(51) Int. Cl.[7] ................................. H04Q 7/22
(52) U.S. Cl. .................. 455/430; 455/431; 455/442
(58) Field of Search .................. 455/430, 427, 455/428, 429, 63, 431, 12.1, 13.1, 442

(56) References Cited

U.S. PATENT DOCUMENTS

| | | | | |
|---|---|---|---|---|
| 5,832,380 A | * | 11/1998 | Ray et al. ................ | 455/430 |
| 5,878,346 A | * | 3/1999 | Ray et al. ................ | 455/431 |
| 5,884,166 A | * | 3/1999 | Ray et al. ................ | 455/431 |
| 5,974,317 A | * | 10/1999 | Djuknic et al. .......... | 455/431 |
| 6,072,768 A | * | 6/2000 | Wiedeman et al. ...... | 455/13.1 |

* cited by examiner

Primary Examiner—Daniel Hunter
Assistant Examiner—Thuan T. Nguyen
(74) Attorney, Agent, or Firm—Patton Boggs LLP (57) ABSTRACT

The Doppler insensitive non-terrestrial digital cellular communications network ensures that, independent of the aircraft direction and apparent velocity of the mobile subscriber station, at least one and very likely two cells/antennas, carry the call even though other cells/antennas in the non-terrestrial digital cellular communications network encounter an apparent velocity of the mobile subscriber station which disables system operation. Since the architecture of the non-terrestrial digital cellular communications network and the non-terrestrial communication application have a common element, namely altitude, it is also possible to minimize the Doppler/capacity problem by segmenting the non-terrestrial space into layers, or PN code words. This topology makes use of spatial diversity in the elevation plane, or "Z direction" to ensure that at least one and very likely two layers, can carry the call. Each layer in the cell is formed by an antenna beam, having different system configurations to preset the level of soft hand-off. Spatial diversity within the cell site can also be implemented in the "X & Y directions", or azimuthally. This is accomplished by interleaving cells of different diameters or with differing azimuth sector patterns. In this manner, the periodicity of the cells is randomized, keeping calls in soft hand-off by maintaining a tangential direction of flight with respect to most cell sites, thereby minimizing the Doppler shift of the carrier frequency with respect to the serving cell site.

15 Claims, 4 Drawing Sheets

DOPPLER INSENSITIVE NON-TERRESTRIAL DIGITAL CELLULAR COMMUNICATIONS NETWORK

CROSS-REFERENCE TO RELATED APPLICATIONS

This application is a continuation-in-part of U.S. patent application Ser. No. 08/960,183, filed Oct. 29, 1997 and titled "Non-Terrestrial Subscriber Station", which is a continuation-in-part of application Ser. No. 08/027,133, filed Mar. 8, 1993, now U.S. Pat. No. 5,444,762, titled "Method and Apparatus for Reducing Interference Among Cellular Telephone Signals" and application Ser. No. 07/847,920 filed Mar. 6, 1992, now U.S. Pat. No. 5,557,656, titled "Mobile Telecommunications".

FIELD OF THE INVENTION

This invention relates to non-terrestrial digital cellular communications and, in particular, to a cellular communications network that mitigates the Doppler effects of aircraft velocity on the modulated carrier of the non-terrestrial cellular communications signals.

PROBLEM

It is a problem in the field of digital cellular communications to provide service to aircraft-located mobile subscriber stations, due to the Doppler effects of aircraft velocity on the modulated carrier of the digital cellular signals. Digital cellular communications systems were not designed to tolerate the velocities at which many of the aircraft-located mobile subscriber stations travel and therefore these systems cannot reliably carry calls at these aircraft velocities.

Non-terrestrial cellular communications systems use existing terrestrial Code Division Multiple Access (CDMA) networks, that use orthogonal codes to implement communication channels, or Time Division Multiple Access (TDMA) networks, that use time division multiplexing of a frequency to implement communication channels, as the underlying structure to serve mobile subscriber stations that are located aboard aircraft to reduce network infrastructure costs and to enhance network capacity utilization. These digital cellular network architectures have enhanced system capacity and inherently offer many value-added services, such as Internet browsing and consumer push data applications (sports scores for instance). When the services provided by these systems are extended to non-terrestrial applications, the available market for the service provider is expanded from only the terrestrial subscriber to ubiquitous use anywhere, anytime.

The non-terrestrial digital cellular communications network is therefore a virtual overlay in three dimensional space over the CDMA or TDMA terrestrial cellular network and re-utilizes the base station controllers and mobile switches of the terrestrial CDMA or TDMA cellular network on a partitioned, or virtual basis. When the mobile subscriber stations are airborne, the wireless or "air" interface is accomplished by co-locating airborne-specifically configured equipment at an existing terrestrial cell site (the airborne cell site could also be a stand-alone) with specially designed, upward looking antennas. Terrestrially, these cell sites are presently operating at a carrier frequency of either 800 MHZ or 1.9 GHz and typically have cell radii of less than 40 miles. However, when configured for non-terrestrial operation with upward looking antennas, the operating range of these cell sites may approach a radius of 200 miles, with 80–100 miles being a typical operating range.

The non-terrestrial digital cellular communications network experiences technical design issues not envisioned by the designers of the terrestrial digital cellular communications network. In particular, when the aircraft travels at a high velocity, the movement of the mobile subscriber station, located in the aircraft, creates a Doppler shift or frequency shift of the modulated carrier from the observer's perspective. In addition, when the digital cellular signals are transformed from the frequency domain to the time domain, the digital waveform and its all-critical timing can be severely and negatively impacted. The Doppler frequency shift is frequency dependent, in that the Doppler shift at 1.9 GHz is over two times the Doppler shift at 800 MHZ. Thus, there is a maximum aircraft velocity at which the non-terrestrial network can reliably carry calls for the mobile subscriber station. For some networks, such as versions of TDMA used in 800 MHZ (SMR) applications, the maximum operating velocities for aircraft based mobile subscriber stations are on the order of 130 MPH. For 1.9 GHz Personal Communication System (PCS) CDMA networks, the maximum velocities for aircraft based mobile subscriber stations approach 500 MPH (Frame Error Rates (FER) tend to become very high around 450 MPH). In either example, these maximum velocities are well below those of high-end business aircraft, commercial aircraft and military aircraft. This velocity constraint presents a serious limitation to the applicability of re-using an existing terrestrial digital cellular communications network for a multitude of airborne applications.

SOLUTION

The above-described problems are solved and a technical advance achieved by the present Doppler insensitive non-terrestrial digital cellular communications network which ensures that, independent of the aircraft direction and apparent velocity of the mobile subscriber station, at least one and very likely two cells/antennas, carry the call even though other cells/antennas in the non-terrestrial digital cellular communications network encounter an apparent velocity of the mobile subscriber station which disables system operation.

The traditional CDMA cellular network architecture was designed to carry a wireless call between a mobile subscriber station and a base station, by simultaneously using multiple base stations or antennas to mitigate the effects of signal fading of various types, including, but not limited to: Raleigh, rician and log-normal. If one cell or one antenna in the CDMA cellular network has a poor signal for a given time frame, another cell or antenna in the CDMA cellular network which had an acceptable signal carries the call. This call management process is called soft or softer hand-off, depending on whether the call is carried between two cells or two antennas at a given cell, respectively.

For the non-terrestrial digital cellular communications network, a similar approach is taken, with the primary purpose of the call hand-off being to mitigate the Doppler effects of aircraft velocity on the modulated carrier of the digital cellular signals. Given a network topology of contiguous cells, the non-terrestrial cellular network can be designed to automatically self-compensate for the Doppler effects of aircraft velocity by having, at any given moment, at least one cell site with respect to which the aircraft has a relative velocity that is less than the system maximum. In this manner, the non-terrestrial network, not the hardware or software in the mobile subscriber station or base station, is responsible for compensating for the Doppler effects of aircraft velocity. This allows an existing CDMA terrestrial cellular network, which was not designed for the high velocities of the non-terrestrial mobile subscriber stations, to be re-used for non-terrestrial applications. Thus, with the correct network architecture and topology, a velocity constrained cellular communications network can now be simultaneously used for both terrestrial and non-terrestrial applications.

This velocity independence is achieved by having substantially complete cell extent overlap with adjacent cells. This ensures that, independent of the aircraft direction and apparent velocity of the mobile subscriber station, at least one and very likely two cells/antennas, can carry the call even though other cells/antennas in the non-terrestrial digital cellular communications network encounter an apparent velocity of the mobile subscriber station which disables system operation. Since the architecture of the non-terrestrial digital cellular communications network and the non-terrestrial communication application have a common element, namely altitude, it is also possible to minimize the Doppler/capacity problem by segmenting the non-terrestrial space into layers (also termed "cell elevation sectors"), or PN code words. This topology makes use of spatial diversity in the elevation plane, or "Z direction," to ensure that at least one and very likely two layers of a cell, can carry the call. By having the uppermost cell elevation sector configured for a higher level of soft and/or softer hand-off, some call handling capacity is traded for optimum system management of velocity induced Doppler frequency shift. The lower cell elevation sector(s), where aircraft fly slower is first optimized for call handling capacity. The minimum segmentation of the non-terrestrial space in a particular cell is two cell elevation sector, with the maximum segmentation of the non-terrestrial space being limited by practical implementation issues. Each cell elevation sector in the cell is formed by an antenna beam, having different system configurations to pre-set the level of soft hand-off and/or softer hand-off. In addition to shaping and directional control of antenna beams, adjustment of the forward link power and reverse link sensitivity are methods of implementing diversity in the network.

Spatial diversity within the cell site can also be implemented in the "X & Y directions", or azimuthally. This is accomplished by interleaving cells of different diameters and/or sector size and orientation. In this manner, the periodicity of the cells is randomized, keeping calls in soft hand-off or softer hand-off by maintaining a tangential direction of flight with respect to most cell sites, thereby minimizing the Doppler shift of the carrier frequency with respect to the serving cell site. This method can be employed to allow hand-offs between the non-terrestrial network and the existing terrestrial network to maximize the reuse of the network. Interleaving cells of varying size also allows for network optimization. Certain flight corridors that require additional call carrying capacity can be optimized by installing a larger number of small diameter cells, or by reorienting existing cell sites to improve the network hand-off characteristics.

The above-described attributes of the Doppler insensitive non-terrestrial digital cellular communications network allows optimization of the call handling capacity and allows compatibility with the existing terrestrial cell sites. Another benefit of this Doppler insensitive non-terrestrial digital cellular communications network is the ability to deploy the network over terrain of varying features.

DETAILED DESCRIPTION OF THE DRAWINGS

Cellular mobile telecommunication systems provide the service of connecting mobile telecommunication customers, each having a mobile subscriber station, to both land-based customers who are served by the common carrier public telephone network as well as other mobile telecommunication customers. In such a system, all incoming and outgoing calls are routed through Mobile Telecommunication Switching Offices (MTSO), each of which is connected to a plurality of cell sites (base stations) which communicate with mobile subscriber stations located in the area covered by the cell sites. The mobile subscriber stations are served by the cell sites, each of which is located in one cell area of a larger service region. Each cell site in the service region is connected by a group of communication links to the Mobile Telecommunication Switching Office. Each cell site contains a group of radio transmitters and receivers with each transmitter-receiver pair being connected to one communication link. Each transmitter-receiver pair operates on a pair of radio frequencies: one frequency to transmit radio signals to the mobile subscriber station and the other frequency to receive radio signals from the mobile subscriber station. The first stage of a cellular communication connection is set up when a transmitter-receiver pair in a cell site, operating on a predetermined pair of radio frequencies, is turned on and a mobile subscriber station, located in the cell site, is tuned to the same pair of radio frequencies. The second stage of the communication connection is between the communication link connected to this transmitter-receiver pair and the common carrier public telephone network. This second stage of the communication connection is set up in the Mobile Telecommunication Switching Office, which is connected to the common carrier public telephone network by incoming and outgoing trunks. The Mobile Telecommunication Switching Office contains a switching network to switch mobile customer voice and/or data signals from the communication link to an incoming or outgoing trunk. The mobile telecommunication system is controlled by a mobile telecommunication controller at the Mobile Telecommunication Switching Office and a cell site controller at each cell site associated with the Mobile Telecommunication Switching Office. A plurality of data links connect the mobile telecommunication controller and the associated cell site controllers. The mobile telecommunication controller operates under control of complex software and controls the switching network. The mobile telecommunication controller also controls the actions of the associated cell site controllers by generating and interpreting the control messages that are exchanged with the associated cell site controllers over the data links. The cell site controllers at each cell site, in response to control messages from the Mobile Telephone Switching Office, control the transmitter-receiver pairs at the cell site. The control processes at each cell site also control the tuning of the mobile subscriber stations to the selected radio frequencies. In the case of CDMA, the system also selects the PN code word to enhance isolation.

Each cell in the ground-based cellular mobile telecommunication network comprises a predetermined volume of space radially arranged around the cell site transmitting antenna with the region of space roughly approximating a cylindrical volume having limited height. Since all of the mobile subscriber stations are installed in ground-based units (such as motor vehicles or handheld units) in traditional cellular mobile telecommunication systems, the antenna radiation pattern of the cell site is aligned to be proximate to the ground and the polarization of the signals produced by the cell site antenna is vertical in nature. In order to prevent the radio signals in one cell site from interfering with radio signals in an adjacent cell site, the transmitter frequencies for adjacent cell sites are selected to be different so that there is sufficient frequency separation between adjacent transmitter frequencies to avoid overlapping transmissions among adjacent cell sites. In order to reuse the same frequencies, the cellular telecommunication industry has developed a small but finite number of transmitter frequencies and a cell site allocation pattern that ensures that two adjacent cell sites do not operate on the same frequency. When a ground-based mobile subscriber station initiates a call connection, control signals from the local cell site transmitter cause the frequency agile transponder in the ground-based mobile subscriber station to operate at the frequency of operation designated for that particular cell site. As the ground-based mobile subscriber station moves from one cell site to another, the call connection is handed off to the successive cell sites and the frequency agile transponder in the ground-based mobile subscriber station adjusts its frequency of operation to correspond to the frequency of operation of the transmitter located in the cell site in which the ground-based mobile subscriber station is presently operational.

There are numerous technologies that can be used to implement the cellular mobile telecommunication system and these include both digital and analog paradigms, with the digital apparatus representing the more recent of the two technologies. Furthermore, the frequency spectrum is allocated for different cellular communication systems, with the personal communication system (PCS) systems being located in the 1.9 GHz region of the spectrum while traditional cellular systems are located in the 800 MHZ region of the spectrum. The access methods used in cellular communication systems include Code Division Multiple Access (CDMA) that uses orthogonal codes to implement communication channels, Time Division Multiple Access (TDMA) which uses time division multiplexing of a frequency to implement communication channels and Frequency Division Multiple Access (FDMA) which uses separate frequencies to implement communication channels, as well as combinations of these technologies. These concepts are well known in the field of cellular communications and various ones of these can be used to implement the ubiquitous mobile subscriber station of the present invention. These technologies are not limitations to the system which is described herein, since a novel system concept is disclosed, not a specific technologically limited implementation of an existing system concept.

The multi-dimensional cellular mobile telecommunication system noted above extends the usage of existing cellular mobile telecommunication radio frequencies allocated for ground-based communications to non-terrestrial mobile subscriber stations in a manner that avoids the possibility of signal interference between the ground-based and non-terrestrial mobile subscriber stations operating in the same area. The multi-dimensional cellular mobile telecommunication system adds an overlay of non-terrestrial cells of predetermined geometry and locus in space to the existing ground-based cellular mobile telecommunication network. The polarization of the cellular radio signals produced by the non-terrestrial antenna elements is a polarization that is different than and preferably substantially orthogonal to the polarization of the cellular radio signals produced by the ground-based antennas, such as a horizontal polarization, to thereby minimize the possibility of interference with the nominally vertically polarized ground-based cellular radio signals. Furthermore, the control signals exchanged between the non-terrestrial mobile subscriber stations and the non-terrestrial cell site controller are architected to avoid the possibility of interference with ground-based cell site transmitter-receiver pairs. In particular, the control channels used for the non-terrestrial mobile subscriber stations are selected such that the control signals transmitted in these channels are unrecognizable to the ground-based mobile subscriber stations and cell site transmitter-receiver pairs, so that even if broadcasts from a non-terrestrial mobile subscriber station reach a ground-based mobile subscriber station or cell site receiver, they cannot be interpreted and are rejected out of hand. In CDMA systems, this feature may also be implemented in the PN code space to provide signal isolation.

Multi-Dimensional Cellular Mobile Telecommunication Network Architecture

Figure 1:
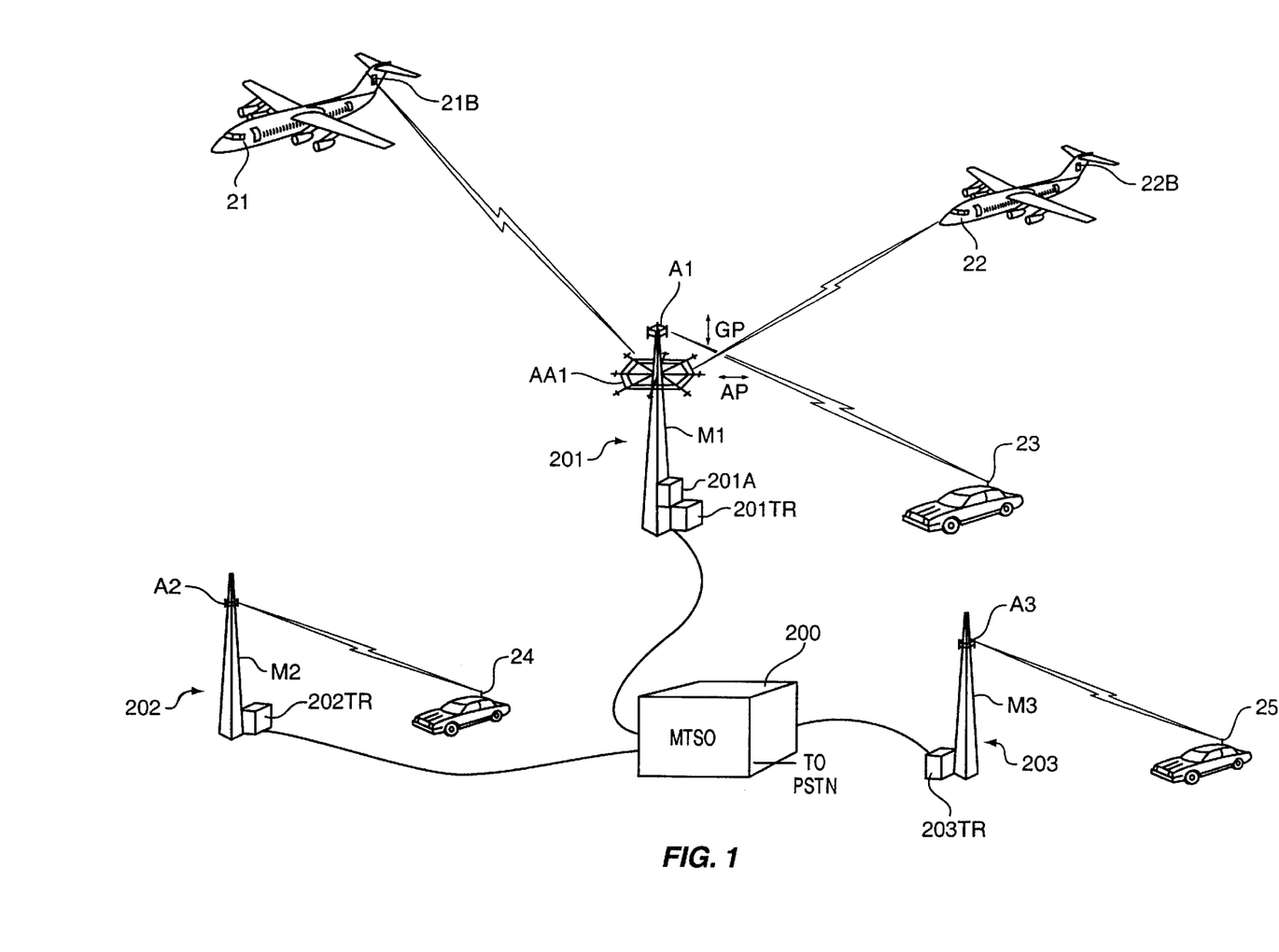
FIG. 1 illustrates, in block diagram form, the overall architecture of a multi-dimensional cellular mobile telecommunication network.

FIG. 1 illustrates, in block diagram form, the overall architecture of a multi-dimensional cellular mobile telecommunication network. This diagram illustrates the basic concepts of the multi-dimensional cellular mobile telecommunication network and, for the purpose of simplicity of illustration, does not comprise all of the elements found in a typical network. The fundamental elements disclosed in FIG. 1 provide a teaching of the interrelationship of the various elements which are used to implement a multi-dimensional cellular mobile telecommunication network.

The terms "cell site" and "cell" are sometimes loosely used in the literature, and the term "cell site" generally denotes the locus at which the transmitter and receiver apparatus is located, while the term "cell" generally denotes the region of space which is served by a particular transmitter-receiver pair which is installed at a cell site. The particular technology used to implement the communications between subscriber stations and the transmitter-receiver pairs as well as the nature of the data transferred there between, be it voice, video, telemetry, computer data, and the like, are not limitations to the system which is described herein, since a novel system concept is disclosed, not a specific technologically limited implementation of an existing system concept. Therefore, the term "cellular" as it is used herein denotes a communication system which operates on the basis of dividing space into a plurality of volumetric sections or cells, and managing communications between subscriber stations located in the cells and the associated transmitter-receiver pairs located at the cell site for each of these cells. In addition, the term "telecommunications cell" is used in the general sense and includes a traditional cell generated by a cell site as well as a sector of a cell, as well as a cell elevation sector, regardless of size and shape.

The cellular radio telecommunication service provided in North America, for example, is designed primarily for motor vehicles and other ground-based mobile subscriber stations. The system presently in use uses a plurality of radio frequency channels in the Ultra-High Frequency (UHF) band. A channel in this system comprises a pair of UHF frequencies in the designated band. One frequency in the channel is termed the "forward" carrier and is used for transmissions from the base station to the mobile subscriber station, while the other frequency in the pair is termed the "reverse" carrier and is used for transmissions from the mobile subscriber station to the base station. Present technologies in use include analog Frequency Modulation (FM) as the method for transmitting the signal with a 30 kHz frequency channel spacing. There is also digital transmission capability in some systems, wherein a plurality of signals are multiplexed on to the same carrier, with the 30 kHz spacing between adjacent bands (TDMA) or the code space is divided into multiple channels (CDMA).

In North America, the 800 MHZ analog spectrum is optimized as follows. A total of 832 such channels are available for cellular telephone use, and these channels are located between the frequencies of 824 MHZ to 849 MHZ, and 869 MHZ to 894 MHZ. The transmitter has 832 communication channels, 790 voice/data communication and 42 control channels. This set of channels is divided into two subsets, each consisting of 21 control channels and an associated 395 voice/data channels. A first set of channels is typically termed the "A" side of the band and the remaining set of channels is typically termed the "B" side of the band. The 416 radio channels in each set of channels are divided into 21 control channels and 395 voice/data communication channels. The 395 voice/data communication channels can be subdivided into a predetermined number of groups, with a typical selection being seven groups of approximately 56 channels in a seven cell channel reuse plan, termed a K=7 plan.

The basic ground-based cellular telecommunication network of the prior art is incorporated into this system to enable the non-terrestrial mobile subscriber stations to be integrated into the existing service structure. In particular, the Mobile Telecommunication Switching Office 200 serves to interconnect a plurality of ground-based cells 201, 202, 203 with the public switched telephone network (PSTN), as noted above. The ground-based cells 201, 202, 203 each include a transmitter-receiver pair 201TR, 202TR, 203TR and an antenna complex, which typically comprises a tower M1, M2, M3 to which is affixed one or more antenna elements A1, A2, A3, respectively.

Existing cellular mobile telecommunication systems use both directional and non-directional antenna elements to implement the desired antenna characteristic pattern. Directional antenna, as the term is used herein, does not imply that a signal is transmitted or received from a particular direction, but that the antenna has a non-isotropic radiation pattern. A directional antenna, or a plurality of directional antenna elements, is preferably used on the ground-based cellular base station to increase signal separation. The antenna structure used in ground-based mobile cellular telecommunications is such that signals emanating from the cell site transmitter antenna elements of antennas A1, A2, A3, propagate in a substantially radial direction from the antenna in all directions with the top of the antenna pattern being substantially coplanar with the Earth's surface and at a level that corresponds to the elevation of the transmitter antenna above the Earth's surface. The receiver antenna has characteristics that are analogous to that of the transmitter antenna. The polarization of these signals is vertical in nature, shown by arrow GP in FIG. 1.

The multi-dimensional cellular mobile telecommunication network adds to the existing mobile cellular telecommunication network one or more non-terrestrial cells. A non-terrestrial cell is defined as an installation which is equipped with at least one non-terrestrial cell site transmitter-receiver pair, such as 201A and an associated antenna AA1 for receiving and transmitting cellular telecommunication transmissions to and from non-terrestrial mobile subscriber stations, such as aircraft 21, 22, which are equipped with mobile subscriber station apparatus 21B, 22B. The non-terrestrial transmitter-receiver pair 201A is interconnected to the Public Switched Telephone Network PSTN via the Mobile Telecommunication Switching Office MTSO. The non-terrestrial cell site antenna AA1 has a radio signal radiation pattern which is directed above a horizontal plane encompassing the antenna. The majority of the radiated radio signal is directed at angles above the horizontal plane, which angles are typically in the range of 1.5° to 4° in magnitude, to avoid interference with ground-based mobile cellular telephone stations 23, 24, 25. The multi-path effect is also minimized since the energy level of the signals impinging on the reflective earth surface is reduced. In addition, the polarization of these radio signals is selected to be substantially orthogonal to the polarization of the radio signals emanating from the ground-based antennas, and is typically horizontally polarized, as shown by arrow AP in FIG. 1. The non-terrestrial cell site transmitter-receiver pair 201A can be integrated with an existing ground-based cell site transmitter-receiver pair, in that there is some sharing of equipment which mounts the antenna elements on a common tower M1 and/or interconnects both cell site transmitter-receiver pairs to the public switched telephone network PSTN. In the embodiment of FIG. 1, the non-terrestrial cell site antenna elements AA1 are mounted on the same tower M1 as the antenna elements A1 used to implement the ground-based cell site. The non-terrestrial cell site antenna elements AA1 are typically mounted below the existing antenna elements A1 used to implement (or reserved for) the ground-based cell site, which also reduces the ground footprint, thus reducing the Service Area Boundary as it exists for a ground-based mobile, meaning the airborne frequency can be re-used on the ground much sooner than otherwise possible.

Doppler Effects in Non-Terrestrial Cellular Communications

The non-terrestrial digital cellular communications network experiences technical design issues not envisioned by the designers of the terrestrial digital cellular communications network. In particular, when the aircraft travels at a high velocity, the movement of the mobile subscriber station, located in the aircraft, creates a Doppler shift or frequency shift of the modulated carrier from the observer's perspective. In addition, when the digital cellular signals are transformed from the frequency domain to the time domain, the digital waveform and its all-critical timing can be severely and negatively impacted. Thus, there is a maximum aircraft velocity at which the non-terrestrial network can reliably carry calls for the mobile subscriber station. For some networks, such as versions of TDMA used in 800 MHZ (SMR) applications, the maximum operating velocities for aircraft based mobile subscriber stations are on the order of 130 MPH. For 1.9 GHz Personal Communication System (PCS) CDMA networks, the maximum velocities for aircraft based mobile subscriber stations approach 500 MPH (Frame Error Rates (FER) tend to become very high around 450 MPH). In either example, these maximum velocities are well below those of high-end business aircraft, commercial aircraft and military aircraft. This velocity constraint presents a serious limitation to the applicability of re-using an existing terrestrial digital cellular communications network for a multitude of airborne applications. The Doppler insensitive non-terrestrial digital cellular communications network described herein uses novel ways to remove the negative effects of velocity induced Doppler frequency shifts. One key constraint in using soft and/or softer hand-off to manage the Doppler issue is to not incur a major system capacity penalty. When soft hand-off is used, multiple cells or antennas are carrying the call on multiple receivers simultaneously. This received information is selected and managed on a frame-by-frame basis by the switch in the Mobile Telecommunication Switching Office MTSO. However, this means that some of those receivers (or PN code word channels in CDMA) are unavailable for use by another aircraft. The base station receiver is capable of tracking and time correlating up to 4 non-time aligned waveforms while the mobile subscriber station in the aircraft has the capability for 3 non-time aligned waveforms. The soft hand-off process is enabled by the Mobile Telecommunication Switching Office MTSO in that the mobile subscriber station set receives a carrier from another cell and requests permission to go into soft or in the case of transferring into another sector of the same cell, softer hand-off with the new cell. When the Mobile Telecommunication Switching Office MTSO authorizes a soft hand-off to occur, based on how it is programmed, the mobile subscriber station set transitions to soft hand-off. For the region of space where high speed aircraft operation is found, the Mobile Telecommunication Switching Office MTSO always has soft hand-off enabled. The optimum solution is a balance between full and complete correction for Doppler shift without unnecessary loss of system capacity due to being in soft hand-off. In existing terrestrial cellular systems, typically 25%–40% of calls are carried in soft hand-off. The present Doppler insensitive non-terrestrial digital cellular communications network provides a larger multiplicity of cells and cell sectors to stimulate more soft and/or softer hand-offs to reduce the effect of Doppler shift. In given areas, the cell topology and Mobile Telecommunication Switching Office MTSO configuration are optimized to better serve the general flight paths that are used in aircraft operations.

Fortunately, the relative fast movement of aircraft over the ground adds a favorable statistical element to overall erlang or system capacity. The majority of general aviation aircraft are not capable of flying faster than 500 MPH; presently only 3% can fly faster than 500 MPH. However, a major market segment, commercial aircraft, almost universally fly faster than 500 MPH when at cruising altitude (comprising over 90% of the commercial aircraft population). In addition, in the United States, aircraft do not typically fly at high velocities (greater than 500 MPH) at low altitudes or in controlled airspace. Existing flight control regulation require an indicated airspeed of 250 knots (288 mph) or less below 10,000 Mean Sea Level (MSL) and an indicated airspeed of 200 knots (230 mph) or less below 2500 feet Above Ground Level (AGL). Thus, the airborne application naturally provides a spatial approach to the Doppler/capacity balancing problem.

Cell Extent Overlap

Figure 2:
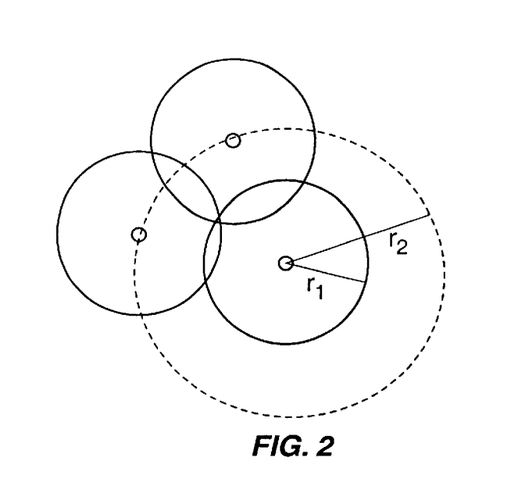
FIG. 2 illustrates the cell extent overlap pattern used in the present Doppler insensitive non-terrestrial digital cellular communications network.
Figure 3A:
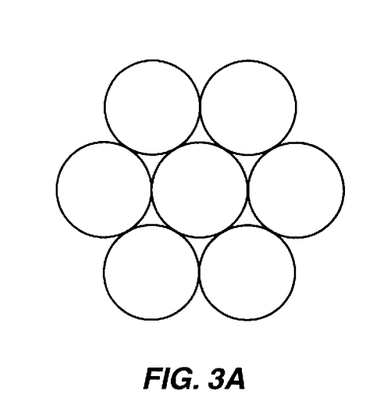
FIGS. 3A, 3B illustrate typical cell repeat patterns.
Figure 3B:
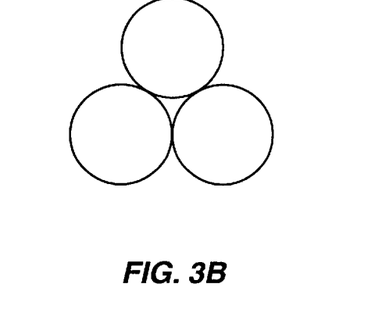

The general solution to velocity induced Doppler frequency shifts is to have substantially complete cell extent overlap with adjacent cells, as shown in FIG. 2. The normal cell extent is given by radius r1, while the extended extent used in the present Doppler insensitive non-terrestrial digital cellular communications network is given by radius r2. This ensures that, independent of the aircraft direction and apparent velocity of the mobile subscriber station, at least one and very likely two cells/antennas, carry the call even though other cells/antennas in the non-terrestrial digital cellular communications network encounter an apparent velocity of the mobile subscriber station which disables system operation. Thus, for the majority of the duration of the call in which the mobile subscriber station is engaged, the call is in the soft hand-off mode. This architecture can be implemented in any general cellular topology with K=7 and K=3 as shown in FIGS. 3A, 3B, respectively, being the preferred balance between overall system capacity and self-interference. For CDMA, the re-use factor K can be either in the frequency or the code domain.

Figure 4:
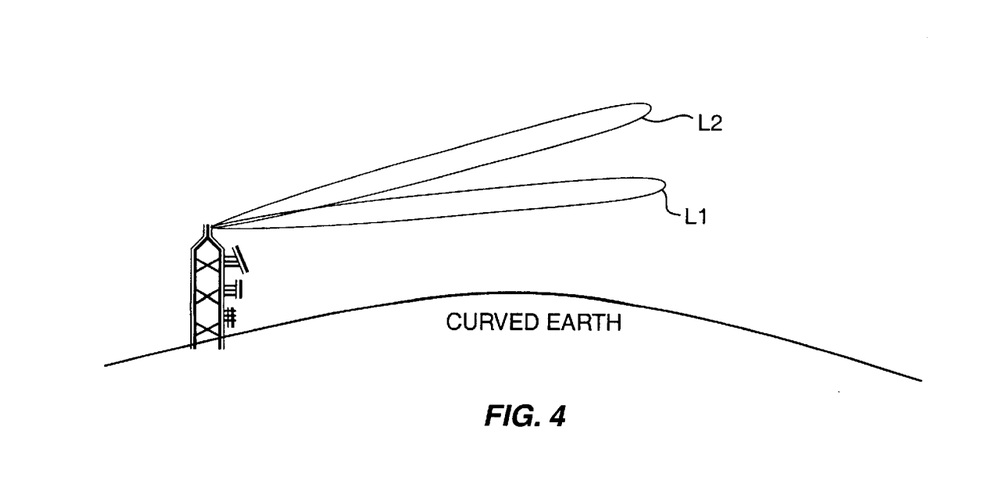
FIG. 4 illustrates the segmentation of the airborne space in the Z direction into layers in the present Doppler insensitive non-terrestrial digital cellular communications network.

Since the architecture and application have a common element, namely altitude, it is possible to optimize the Doppler/capacity problem by segmenting the airborne space of a particular cell into layers, or PN code words, as shown in FIG. 4. The layers are also termed "cell elevation sectors" herein. This topology makes use of spatial diversity in the elevation plane, or "Z direction" of the cell. The minimalist segmentation of the cell is two cell elevation sectors L1, L2, with the maximum being limited by practical implementation issues. Each cell elevation sector is formed by an antenna beam to create separate cell elevation sectors, each having different system configurations to pre-set the level of soft hand-off, in terms of the percentage of calls carried in soft hand-off or softer hand-off. The cell elevation sectors themselves can be subdivided into multiple sectors. Thus, a cell can have multiple elevation sectors and multiple sectors at each elevation. This enables precise management of the level of soft hand-offs between sectors of a particular cell, such as sector 1 of cell elevation 2 to sector 2 of cell elevation 1, or soft hand-offs between adjacent cells, such as sector 1 of cell 1 to sector 3 of cell 2. In a typical architecture, the upper cell elevation sector of the cell, above 10,000 feet Mean Sea Level (MSL), is configured to have substantially complete cell overlap with adjacent cells and is in the soft hand-off mode nearly all of the time. The lower cell elevation sector, below 10,000 feet Mean Sea Level (MSL), is optimized for Doppler/capacity, in that for the lower altitude cell elevation sector, the system is in soft hand-off 25% to 40% of the time. The upper altitude coverage cell elevation sector is also shaped by the earth's curvature; for instance, at 80 miles, the smooth curved earth line-of-site altitude is around 4000 feet Above Ground Level (AGL). The spatial diversity can be further enhanced by tuning the forward link power. Optimal setting of the forward link power allows calls in the cell to complete hand-off at lower altitudes, and maintain calls in soft hand-off between cells at higher altitudes. The optimal setting is determined through propagation modeling or actual flight tests to measure the usable cell extent at a particular cell site as a function of transmitted signal power. In CDMA systems, this is termed "breathing" where the cell size dynamically changes based upon the ambient conditions.

Figure 5:
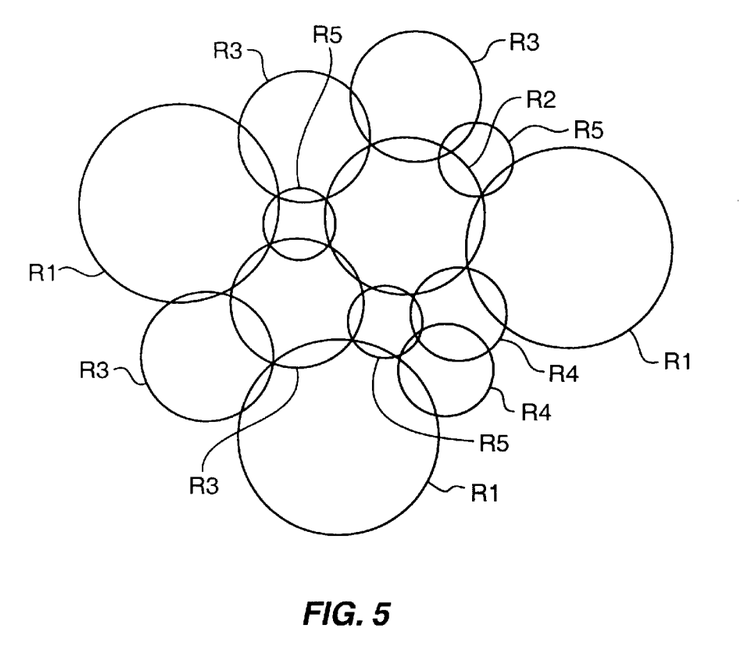
FIG. 5 illustrates the segmentation of the airborne space in the X and Y directions by interleaving cells of different diameters in the present Doppler insensitive non-terrestrial digital cellular communications network.
Figure 7:
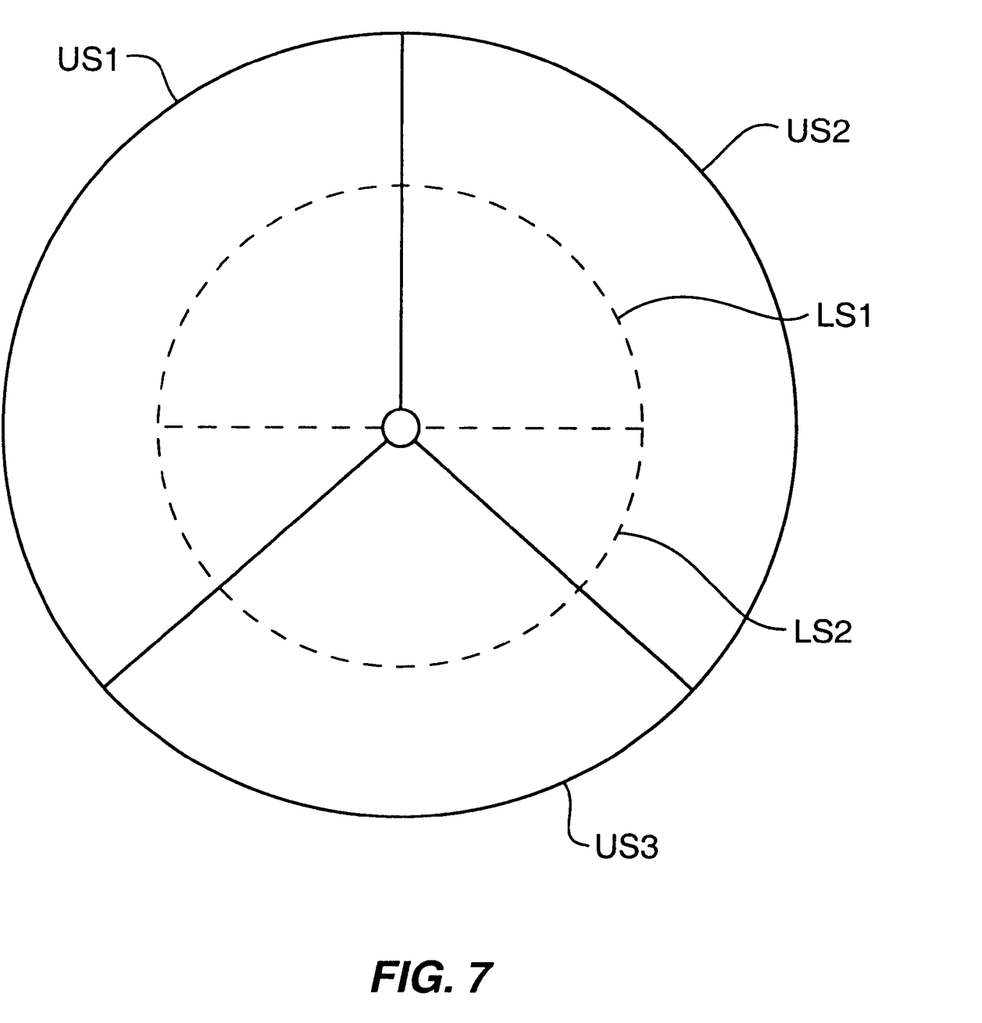
FIG. 7 illustrates one embodiment of the cell extent overlap pattern used in the present Doppler insensitive non-terrestrial digital cellular communications network.

Spatial diversity within a cell can also be implemented in the "X & Y directions". This is accomplished by interleaving cells of different diameters as shown in FIG. 5 or differing sector patterns as shown in FIG. 7. In this manner, the cell radius is non-uniform or heterogeneous among the plurality of cells, with five different radii R1–R5 being shown in FIG. 5 as an example and the radius of the sectors US1–US3 of the uppermost cell elevation sector is different than the radius of the sectors LS1–LS2 of the lower cell elevation sector. The term "heterogeneous" as used herein indicates a lack of identical radius of all of the plurality of cells, although many of the cells may have identical radius, all of the cells do not have the same radius, as shown in FIG. 5. Thus, the periodicity of the cells is randomized, keeping calls in soft hand-off by maintaining a tangential direction of flight with respect to most cells, thereby minimizing Doppler shift. This method could also be employed to allow hand-off between the non-terrestrial network and the existing terrestrial network to maximize reuse of the network. Interleaving cells of varying size allows network optimization. Certain flight corridors that require additional call handling capacity can be optimized by installing a larger number of small diameter cells, or by reorienting existing cells to improve the network hand-off characteristics. These methods allow optimization of system call handling capacity, and allow compatibility with the existing terrestrial sites. Another benefit of this method is the ability to deploy the network over varying terrain.

Figure 6:
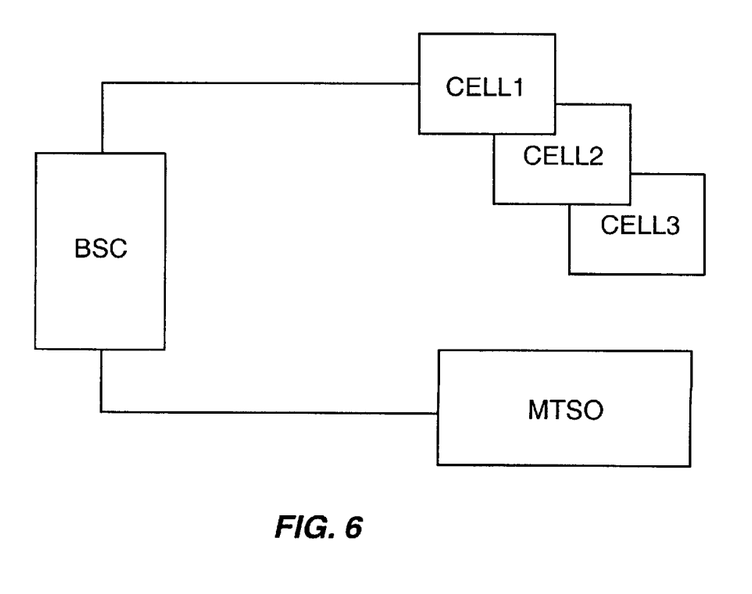
FIG. 6 illustrates the general switch and base station controller architecture of the present Doppler insensitive non-terrestrial digital cellular communications network.

The general switch and base station controller architecture is shown in FIG. 6. This topology optimally re-uses existing assets in the wireless network, since the Base Station Controller BSC manages a plurality of cells Cell 1–Cell 3 to provide the network architecture described above. The Base Station Controller BSC is connected with the Mobile Telecommunication Switching Office MTSO to extend the calls to the Public Switched Telephone Network PTSN.

SUMMARY

The Doppler insensitive non-terrestrial digital cellular communications network ensures that, independent of the aircraft direction and apparent velocity of the mobile subscriber station, at least one and very likely two cells/antennas, carry the call even though other cells/antennas in the non-terrestrial digital cellular communications network encounter an apparent velocity of the mobile subscriber station which disables system operation. This is accomplished by proper segmentation of the airborne space within the cells of the non-terrestrial digital cellular communications network and the proper siting of the cells.

What is claimed:

1. A cellular mobile telecommunication network for providing cellular radio communication with non-terrestrial mobile subscriber stations located in aircraft in flight, where said non-terrestrial mobile subscriber stations engage in calls via said cellular mobile telecommunication network, comprising:
    means for generating a plurality of telecommunication cells, each telecommunication cell having three-dimensional extent, said plurality of telecommunications cells having substantially complete cell overlap with adjacent ones of said plurality of telecommunication cells; and
    means for receiving communication signals generated by said non-terrestrial mobile subscriber stations extant in each of said plurality of telecommunication cells, for maintaining said calls in at least one of: a soft hand-off mode and a softer hand-off mode, among at least two of said plurality of telecommunication cells for the majority of the duration of said call.

2. The cellular mobile telecommunication network of claim 1 wherein said means for generating comprises:
    at least one transmitter means for generating a telecommunication cell having a plurality of cell elevation sectors, each of said plurality of cell elevation sectors being separated in altitude.

3. The cellular mobile telecommunication network of claim 2 wherein at least one of said plurality of cell elevation sectors is tuned for forward link power to allow calls to complete handoff at ones of said plurality of cell elevation sectors.

4. The cellular mobile telecommunication network of claim 1 wherein said means for generating comprises:
    first transmitter means for generating a telecommunication cell having a first extent; and
    second transmitter means for generating a telecommunication cell having a second extent, wherein said first extent and said second extent differ in at least one of: radius, altitude, and shape.

5. The cellular mobile telecommunication network of claim 1 wherein said means for generating comprises:
    a plurality of transmitter means, each generating one of said plurality of telecommunication cells, each telecommunication cell having three-dimensional extent, including a radius, said radius of said plurality of telecommunications cells being heterogeneous among said plurality of telecommunication cells to produce substantially complete cell overlap with adjacent ones of said plurality of telecommunication cells.

6. A method of operating a cellular mobile telecommunication network for providing cellular radio communication with non-terrestrial mobile subscriber stations located in aircraft in flight, where said non-terrestrial mobile subscriber stations engage in calls via said cellular mobile telecommunication network, comprising the steps of:
    generating a plurality of telecommunication cells, each telecommunication cell having three-dimensional extent, said plurality of telecommunications cells having substantially complete cell overlap with adjacent ones of said plurality of telecommunication cells; and
    receiving communication signals generated by said non-terrestrial mobile subscriber stations extant in each of said plurality of telecommunication cells, for maintaining said calls in at least one of: a soft hand-off mode and a softer hand-off mode among at least two of said plurality of telecommunication cells for the majority of the duration of said call.

7. The method of operating a cellular mobile telecommunication network of claim 6 wherein said step of generating comprises:
    operating at least one transmitter for generating a telecommunication cell having a plurality of cell elevation sectors, each of said plurality of cell elevation sectors being separated in altitude.

8. The method of operating a cellular mobile telecommunication network of claim 7 wherein at least one of said plurality of cell elevation sectors is tuned for forward link power to allow calls to complete handoff at ones of said plurality of cell elevation sectors.

9. The method of operating a cellular mobile telecommunication network of claim 6 wherein said step of generating comprises:

operating a first transmitter for generating a telecommunication cell having a first extent; and operating a second transmitter for generating a telecommunication cell having a second extent, wherein said first extent and said second extent differ in at least one of: radius, altitude, and shape.

10. The method of operating a cellular mobile telecommunication network of claim 6 wherein said step of generating comprises:

operating a plurality of transmitters, each generating a one of said plurality of telecommunication cells, each telecommunication cell having three-dimensional extent, including a radius, said radius of said plurality of telecommunications cells being heterogeneous among said plurality of telecommunication cells to produce substantially complete cell overlap with adjacent ones of said plurality of telecommunication cells.

11. A cellular mobile telecommunication network for providing cellular radio communication with non-terrestrial mobile subscriber stations located in aircraft in flight, where said non-terrestrial mobile subscriber stations engage in calls via said cellular mobile telecommunication network, comprising:

a plurality of cell site means for generating a plurality of telecommunication cells, each telecommunication cell having three-dimensional extent, said plurality of telecommunications cells having substantially complete cell overlap with adjacent ones of said plurality of telecommunication cells; and signal receiver means for receiving communication signals generated by said non-terrestrial mobile subscriber stations extant in each of said plurality of telecommunication cells, for maintaining said calls in at least one of: a soft hand-off mode and a softer hand-off mode among at least two of said plurality of telecommunication cells for the majority of the duration of said call.

12. The cellular mobile telecommunication network of claim 11 wherein each of said plurality of cell site means comprises:

a transmitter means for generating a telecommunication cell having a plurality of cell elevation sectors, each of said plurality of cell elevation sectors being separated in altitude.

13. The cellular mobile telecommunication network of claim 12 wherein at least one of said plurality of cell elevation sectors is tuned for forward link power to allow calls to complete handoff at ones of said plurality of cell elevation sectors.

14. The cellular mobile telecommunication network of claim 11 wherein said plurality of cell site means comprises:

first transmitter means for generating a telecommunication cell having a first extent; and second transmitter means for generating a telecommunication cell having a second extent, wherein said first extent and said second extent differ in at least one of: radius, altitude, and shape.

15. The cellular mobile telecommunication network of claim 11 wherein said plurality of cell site means comprises:

a plurality of transmitter means, each generating one of said plurality of telecommunication cells, each telecommunication cell having three-dimensional extent, including a radius, said radius of said plurality of telecommunications cells being heterogeneous among said plurality of telecommunication cells to produce substantially complete cell overlap with adjacent ones of said plurality of telecommunication cells.

* * * * *

UNITED STATES PATENT AND TRADEMARK OFFICE
CERTIFICATE OF CORRECTION

PATENT NO. : 6,377,802 B1
DATED : April 23, 2002
INVENTOR(S) : Daniel Bernard McKenna and Brian Joseph Cox

It is certified that error appears in the above-identified patent and that said Letters Patent is hereby corrected as shown below:

<u>Title page,</u>
Item [63], delete "08/027,133" and substitute -- 08/027,333 --.

Signed and Sealed this

Eighth Day of October, 2002

Attest:

JAMES E. ROGAN
Attesting Officer          Director of the United States Patent and Trademark Office